United States Patent
Ko (10) Patent No.: US 10,924,728 B2
(45) Date of Patent: Feb. 16, 2021

(54) HEAD MOUNTED DISPLAY AND LIGHT ADJUSTING METHOD THEREOF

(71) Applicant: Acer Incorporated, New Taipei (TW)

(72) Inventor: Chueh-Pin Ko, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/590,376

(22) Filed: Oct. 2, 2019

(65) Prior Publication Data

US 2020/0154098 A1    May 14, 2020

(30) Foreign Application Priority Data

Nov. 14, 2018    (TW) .............................. 107140345 A (51) Int. Cl.
*H04N 13/344*    (2018.01)
*H04N 13/398*    (2018.01)

(52) U.S. Cl.
CPC ......... *H04N 13/344* (2018.05); *H04N 13/398* (2018.05)

(58) Field of Classification Search
CPC .............................. G02B 27/017; H04N 7/185
USPC ............................................................ 345/7
See application file for complete search history.

(56) References Cited

U.S. PATENT DOCUMENTS

| 2015/0234189 A1* | 8/2015 | Lyons | A63F 13/26 345/174 |
| 2016/0021358 A1* | 1/2016 | Yang | G02B 27/0093 345/8 |
| 2018/0120497 A1* | 5/2018 | Shi | G02B 6/0068 |

* cited by examiner

*Primary Examiner* — Clifford Hilaire
(74) *Attorney, Agent, or Firm* — JCIPRNET (57) ABSTRACT

The disclosure provides a head mounted display (HMD) and a light adjusting method thereof. The HMD includes a housing, a first chamber, a second chamber, and a light source. The first chamber is disposed in the housing and disposed with a display, wherein the display plays a video content. The second chamber is disposed in the housing and adjacent to the first chamber, wherein a through hole is disposed between the first chamber and the second chamber, and the video content propagates from the first chamber to the second chamber via the through hole. The light source is disposed on at least one side of at least one of the first chamber and the second chamber, wherein the light source provides a light in response to the video content or a system state of the HMD.

14 Claims, 10 Drawing Sheets

HEAD MOUNTED DISPLAY AND LIGHT ADJUSTING METHOD THEREOF

CROSS-REFERENCE TO RELATED APPLICATION

This application claims the priority benefit of Taiwan application serial no. 107140345, filed on Nov. 14, 2018. The entirety of the above-mentioned patent application is hereby incorporated by reference herein and made a part of this specification.

BACKGROUND OF THE INVENTION

1. Field of the Invention

The present disclosure relates to a head-mounted display and an adjusting method thereof, and more particularly to a head-mounted display that provides additional light in response to displayed contents by using a light adjusting method thereof.

2. Description of Related Art

Figure 1:
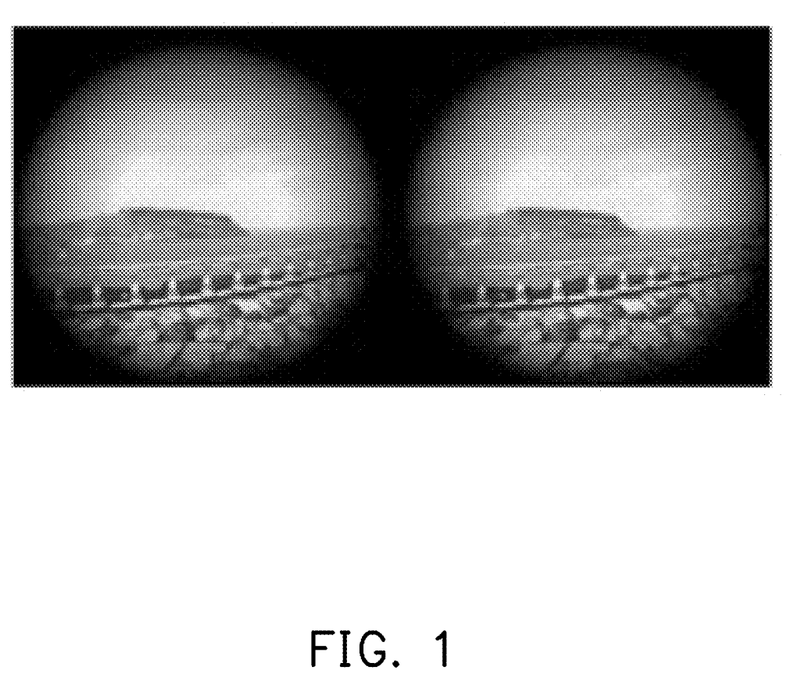
FIG. 1 is a schematic diagram of a conventional HMD visual experience.

A head-mounted display (HMD) is a display device that is worn on the user's head and presents the video information directly to the user's eyes. However, due to the limitation of the existing structure of the HMD, the visual experience perceived by the user often cannot specifically reflect the visual experience that people can feel in the real world. Specifically, since the light in the surrounding environment cannot enter the visual space provided by the HMD to the user, the user may feel like viewing the video content provided by the HMD through a telescope, as shown in FIG. 1. In this case, the user still feels a little unrealistic, which affects the operating experience for the HMD.

SUMMARY OF THE INVENTION

In view of this, the present disclosure provides a head-mounted display and a light adjusting method thereof that can be used to solve the above technical problems.

The present disclosure provides a head-mounted display (HMD) including a housing, a first chamber, a second chamber, and at least one light source. The first chamber is disposed in the housing and disposed with a display, wherein the display is used for playing a video content. The second chamber is disposed in the housing and adjacent to the first chamber, wherein a through hole is disposed between the second chamber and the first chamber, and the video content propagates from the first chamber to the second chamber via the through hole. The at least one light source is disposed on at least one side of at least one of the first chamber and the second chamber, wherein the at least one light source provides at least one light in response to the video content or a system state of the HMD.

The present disclosure provides a light adjusting method of an HMD. The method includes: retrieving a video content of a display in the first chamber or a system state of the HMD; and controlling the at least one light source to provide at least one light in response to the video content or a system state of the HMD, wherein the at least one light source is disposed on at least one side of at least one of the first chamber and the second chamber.

Based on the above, the HMD and the light adjusting method of the present disclosure can provide additional light through a light source disposed in the first chamber and/or the second chamber, thereby allowing the wearer to experience a better visual experience.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

Figure 2A:
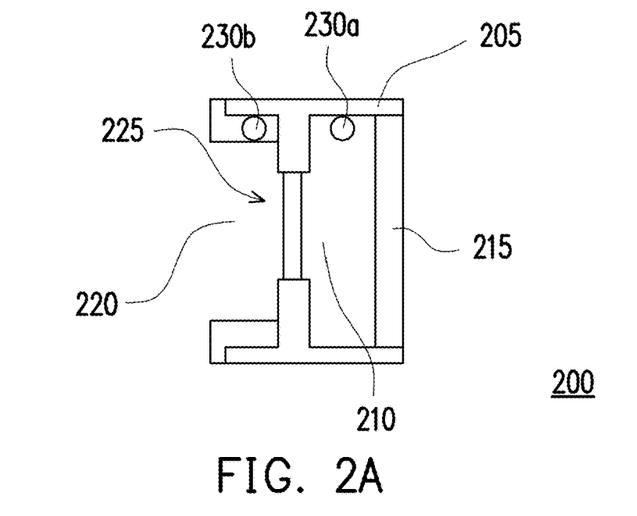
FIG. 2A is a side cross-sectional view of the HMD according to an embodiment of the disclosure.
Figure 2B:
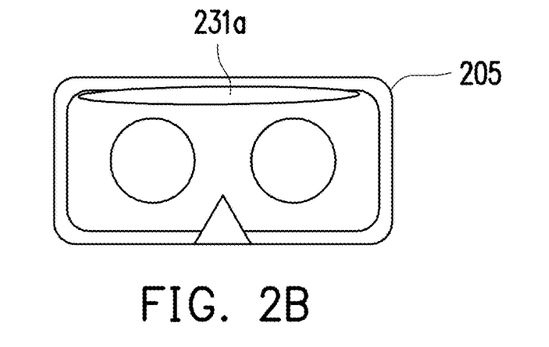
FIG. 2B is a front view of the HMD according to FIG. 2A.
Figure 2C:
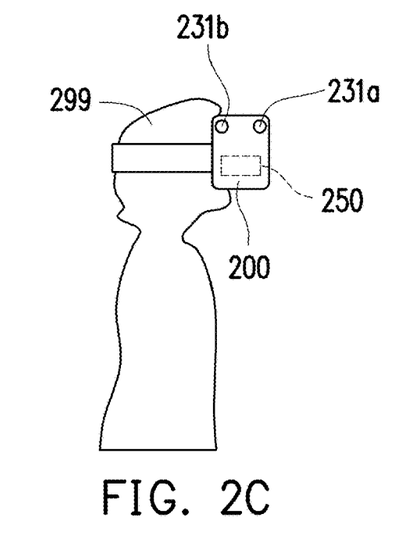
FIG. 2C is a wearing scenario according to FIG. 2A and FIG. 2B.

See FIG. 2A, FIG. 2B and FIG. 2C, wherein FIG. 2A is a side cross-sectional view of the HMD according to an embodiment of the present disclosure, FIG. 2B is a front view of the HMD according to FIG. 2A, and FIG. 2C is a wearing scenario according to FIG. 2A and FIG. 2B. As shown in FIG. 2A, the HMD 200 proposed by the present disclosure includes a housing 205, a first chamber 210, a second chamber 220, and light sources 230a and 230b. In various embodiments, the HMD 200 can be used to play video contents of virtual reality (VR), video contents of first person view (FPV), or other similar video contents.

The first chamber 210 is disposed in the housing 205 and is provided with a display 215, wherein the display 215 can be used to play the above-mentioned video contents. In an embodiment, the video content may be provided by a host computer, a tablet computer, a smart phone connected to the HMD 200, but the disclosure is not limited thereto.

The second chamber 220 is disposed in the housing 205 and adjacent to the first chamber 210. A through hole 225 is disposed between the second chamber 220 and the first chamber 210, and the video content can be propagated from the first chamber 210 to the second chamber 220 via the through hole 225.

In the present embodiment, the first chamber 210 may have a front side and a rear side, wherein the display 215 may be disposed on the front side of the first chamber 210, and the through hole 225 may be disposed on the rear side of the first chamber 210. Similarly, the second chamber 220 may have a front side and a rear side, wherein the through hole 225 may be disposed on the front side of the second chamber 220, and the rear side of the second chamber 220 may be implemented as an open side. As shown in FIG. 2C, the rear side (i.e., the open side) of the second chamber 220 can be used to receive the face of the wearer 299 of the HMD 200.

In this embodiment, the first chamber 210 may have a top side, a bottom side, a left side, and a right side, and the second chamber 220 may have a top side, a bottom side, a left side, and a right side. For ease of understanding, only the top side and the bottom side of the first chamber 210 and the second chamber 220 are depicted in FIG. 2A, and the right and left sides of the first chamber 210 and the second chamber 220 are omitted.

In various embodiments, the light sources 230a and 230b may be implemented as optical elements such as LEDs, OLEDs, etc., but the disclosure is not limited thereto. In FIG. 2A, the light source 230a may be disposed on the top side of the first chamber 210, and the light source 230b may be disposed on the top side of the second chamber 220, but the present disclosure is not limited thereto.

In other embodiments, the light source 230a may also be disposed on the right side, the left side, and/or the bottom side of the first chamber 210. Moreover, the light source 230b may also be disposed on the right side, the left side, and/or the bottom side of the second chamber 220. In addition, in another embodiment, the HMD 200 may also include only the light source 230a, which may be disposed on either side of the first chamber 210 or the second chamber 220. In short, the HMD proposed by the present disclosure can be broadly understood to include at least one light source, and the at least one light source can be disposed on at least one side of one of the first chamber and the second chamber. In addition, when a plurality of light sources are disposed in the HMD, the light sources may also be presented in the form of an array of light sources, and the relevant details will be described later.

For ease of explanation, it will be assumed that the light source of the present disclosure is mounted on the top side of the first chamber and/or the second chamber, but it is not intended to limit the possible embodiments of the present disclosure.

In an embodiment of the disclosure, light sources 230a and 230b may provide lights 231a and 231b in response to the aforementioned video content or system state of the HMD 200.

As shown in FIG. 2C, the HMD 200 of the present disclosure can include a signal processor 250 (which is, for example, a microprocessor or other similar processor) that can be used to determine the specific aspects (e.g., color and/or intensity) of the lights 231a and 231b based on a part of the video content. For example, if the video content is a 360-degree image, the foregoing part of the video content may be the top image of the 360-degree image. In this case, the lights 231a and 231b can be adjusted to correspond to the color of the top image.

Figure 3:
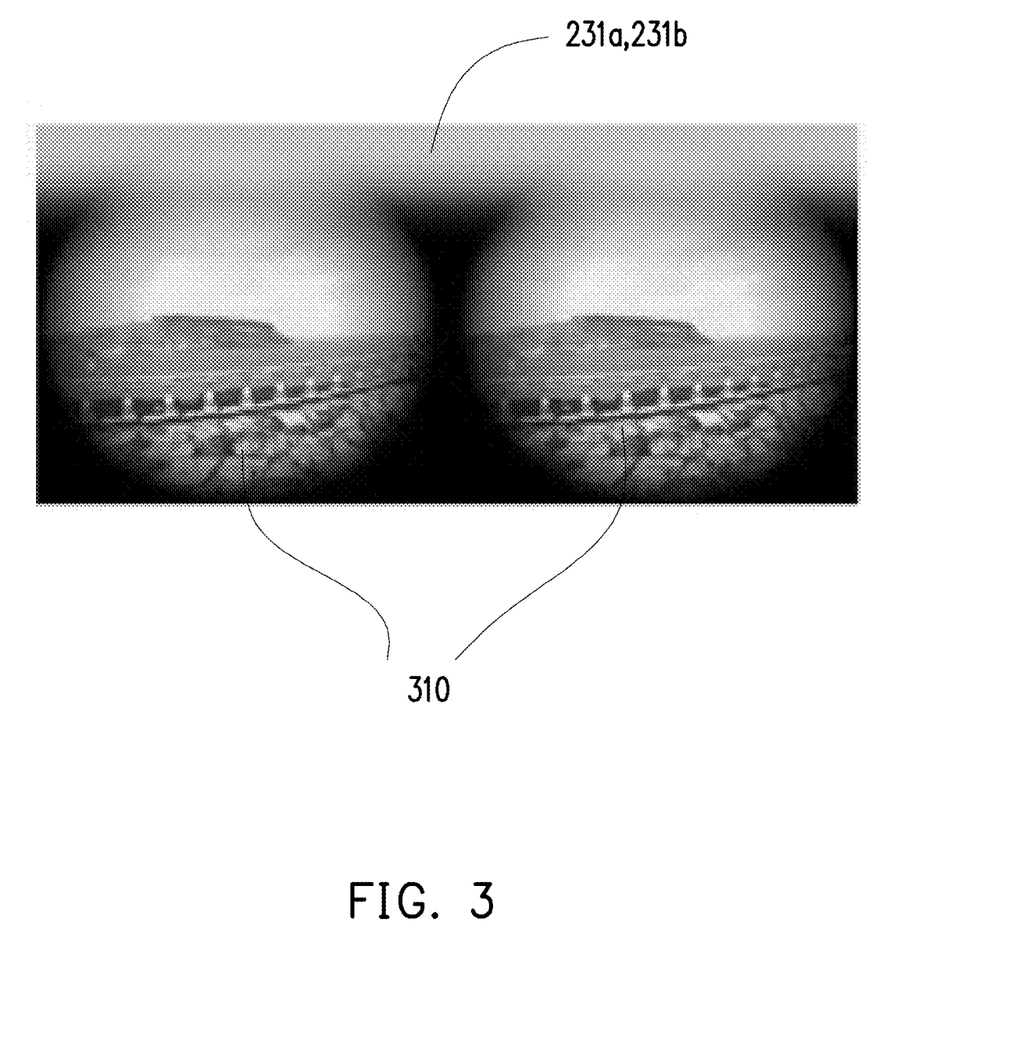
FIG. 3 is a schematic diagram of a visual experience provided by an HMD according to an embodiment of the disclosure.

Please refer to FIG. 3, which is a schematic diagram of a visual experience provided by an HMD according to an embodiment of the disclosure. In FIG. 3, it is assumed that the video content 310 is a picture provided to the wearer 299 by the HMD 200 of FIG. 2A. In the present embodiment, the video content 310 is, for example, a 360-degree image taken under a blue sky. In this case, the top image of the video content 310 should be a blue sky. Accordingly, the lights 231a and 231b provided by the light sources 230a and 230b may be adjusted by the signal processor 250 to present a color (e.g., blue) corresponding to the blue sky.

For another example, if the video content 310 is a 360-degree image taken under the stars, the top image should be a starry sky. Accordingly, the signal processor 250 can adjust the lights 231a and 231b to correspond to the color of the starry sky (e.g., black). For another example, if the video content 310 is a 360-degree image taken under a yellow street light, the top image should be a yellow street light. Accordingly, the signal processor 250 can adjust the lights 231a and 231b to correspond to the color (e.g., yellow) of the yellow street light.

In another embodiment, if the video content does not include content (for example, the top image described above) that can be used as the basis for adjusting the light, the signal processor 250 can also capture a part of the video content corresponding to the side of the light source, and accordingly adjust the way the light is presented.

Taking FIG. 3 as an example, if the video content 310 does not have the aforementioned top image because it is not a 360-degree image, the signal processor 250 can capture the part of the video content on the top side (i.e., the side where the light sources 230a and 230b are disposed in the first chamber 210 and the second chamber 220) of the video content 310. In various embodiments, a part of the content captured by the signal processor 250 is, for example, ⅕ of the top of the video content 310 or other proportions of the picture. Also, the signal processor 250 may determine the colors of the lights 231a and 231b based on the average color of the captured part of the video content, but the disclosure is not limited thereto. In FIG. 3, part of the content captured by the signal processor 250 is, for example, a blue sky, and the signal processor 250 can adjust the lights 231a and 231b accordingly to correspond to the color of the blue sky (for example, blue).

In another embodiment, the specific aspects of the lights 231a and 231b may also depend on the system state of the HMD 200. The foregoing system state is, for example, a device pairing state, a power state, or a related information of a host computer to which the HMD 200 is connected, but the disclosure is not limited thereto.

In addition, the specific aspects of the lights 231a and 231b may also depend on the operating state of the video content. Assuming that the video content provided by the HMD 200 is the game content being performed by the wearer 299, the lights 231a and 231b may be designed to correspond to the current game state of the video content. For example, when the wearer 299 wins, the lights 231a and 231b may appear in green. When the character of the wearer 299 is in a recovering state, the lights 231a and 231b may appear as a green marquee. When the wearer 299 is attacked, the lights 231a and 231b may appear red. Alternatively, the colors of the lights 231a and 231b also appear to correspond to the color of the team to which the wearer 299 belongs.

As mentioned in the previous embodiments, the light source in the HMD of the present disclosure can be represented by an array of light sources, which will be further described below with reference to FIGS. 4 and 5.

Figure 4:
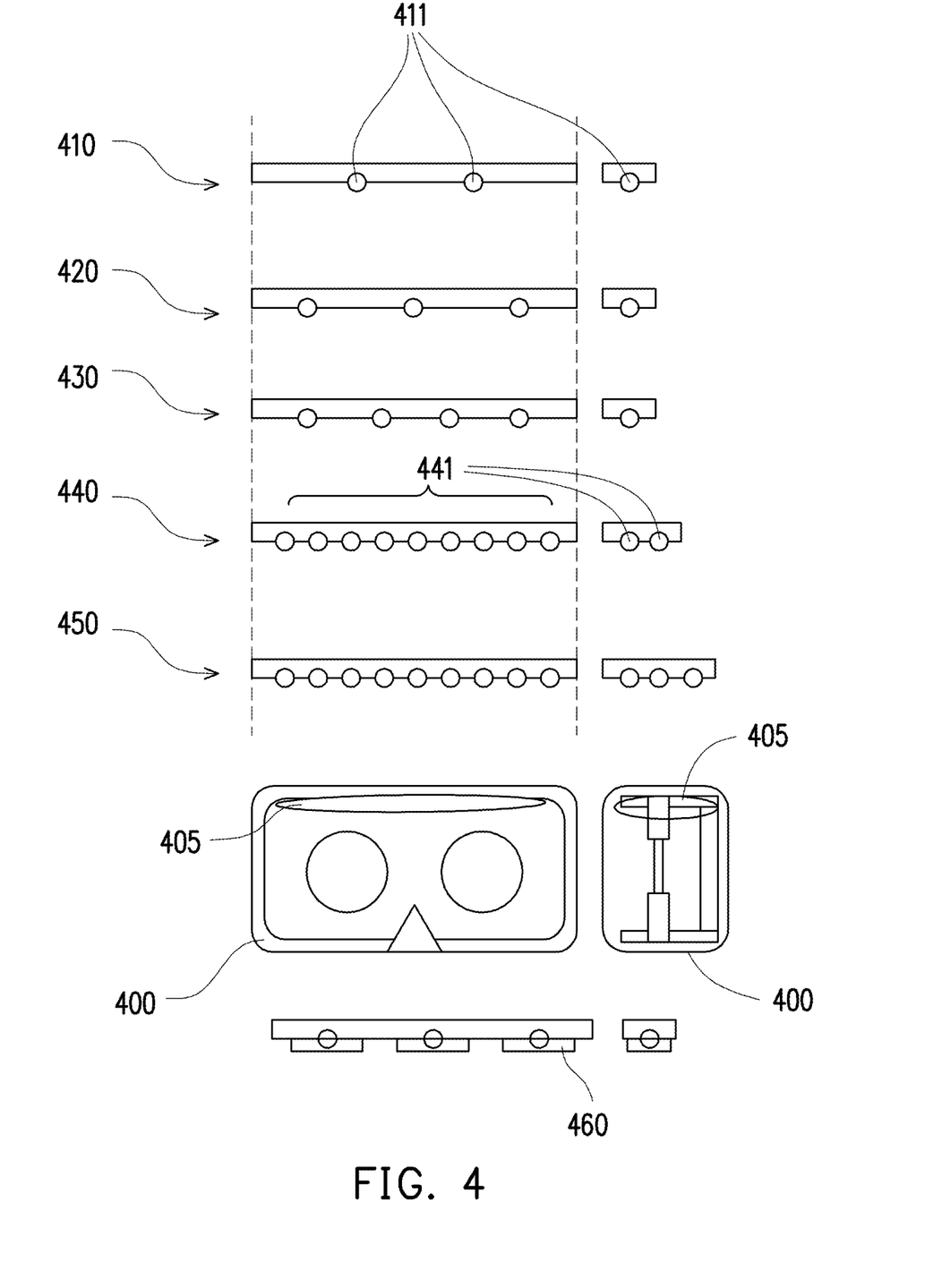
FIG. 4 illustrates a plurality of light source arrays according to embodiments of the disclosure.

Please refer to FIG. 4, which illustrates a plurality of light source arrays according to embodiments of the disclosure. In FIG. 4, each of the illustrated light source arrays 410, 420, 430, 440, and 450 may include m×n point light sources (where m, n are all positive integers).

Taking the light source array 410 as an example, it may include 2×1 point light sources 411. When the light source array 410 is disposed in the HMD 400, the point light source 411 can cooperatively provide the light 405. Moreover, as can be seen from the front view and the side cross-sectional view of the HMD 400 of FIG. 4, since the light source array 410 can be considered to include only one column of point light sources 411, it can be disposed only in the first chamber (not labelled) or the second chamber (not labelled) of the HMD 400.

Taking the light source array 440 as an example, it may include 9×2 point light sources 441. When the light source array 440 is disposed in the HMD 400, the point light source 441 can cooperatively provide the light 405. Moreover, as can be seen from the front view and the side cross-sectional view of the HMD 400 of FIG. 4, since the light source array 440 can be regarded as including only two columns of point light sources 441 (each column includes 9 point light sources 441), the two columns of point light sources 441 can be respectively disposed in the first chamber and the second chamber of the HMD 400, or both in the first chamber or the second chamber of the HMD 400. In addition, the manners and arrangement of the light source arrays 420, 430, and 450 can be referred to the related descriptions of the light source arrays 410 and 440, and are not described herein.

Furthermore, as shown in FIG. 4, the HMD 400 of the present disclosure may further include a light guide plate 460 that can be attached to the light source to provide a better light guiding effect.

Figure 5:
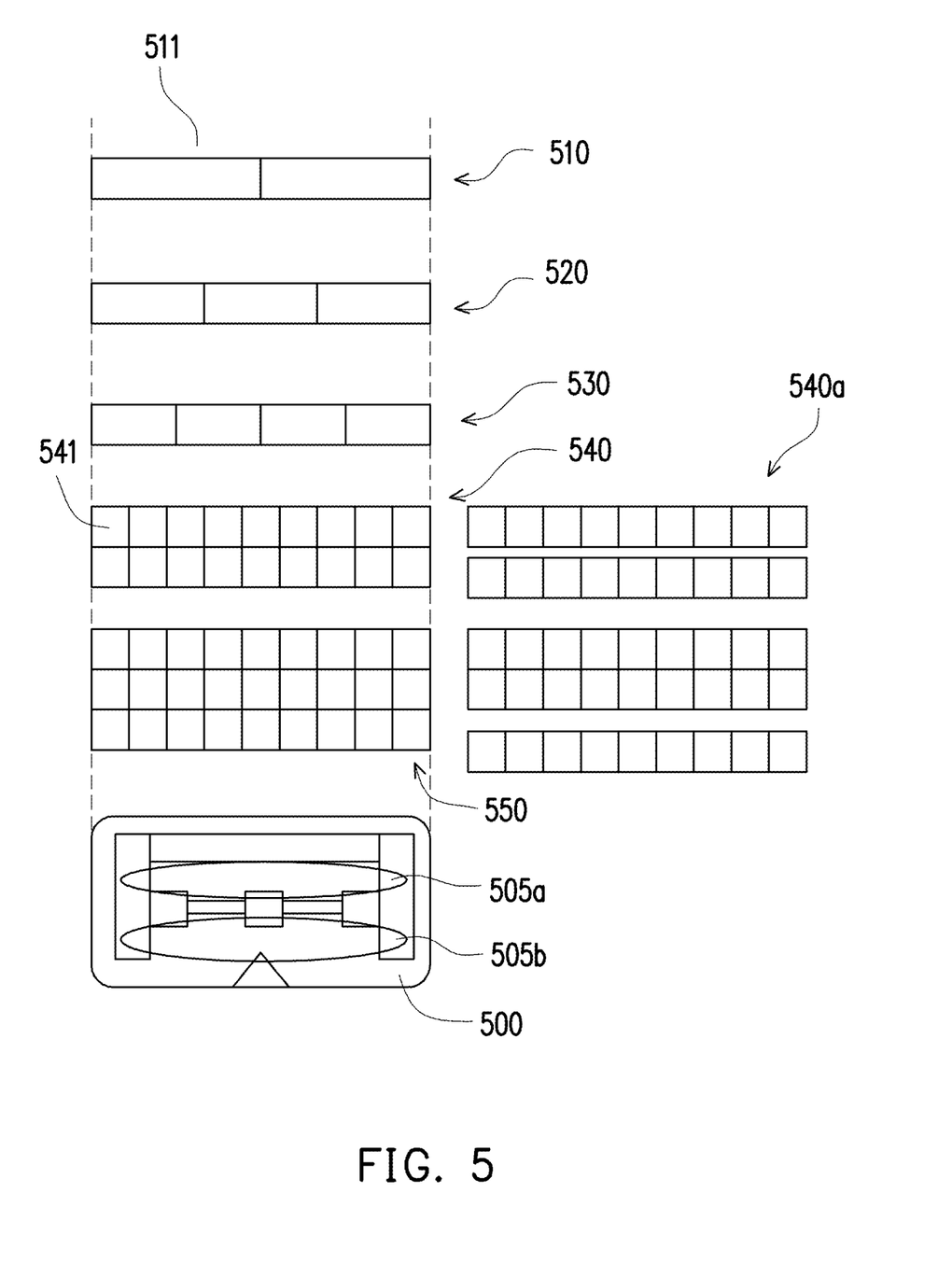
FIG. 5 illustrates a plurality of light source arrays according to other embodiments of the disclosure.

Please refer to FIG. 5, which illustrates a plurality of light source arrays according to other embodiments of the disclosure. In FIG. 5, the illustrated light source arrays 510, 520, 530, 540, and 550 individually includes m×n planar light sources (where m and n are all positive integers).

Taking the light source array 510 as an example, it may include 2×1 planar light sources 511. When the light source array 510 is disposed in the first chamber of the HMD 500, the planar light source 511 can cooperatively provide light 505a. Alternatively, when the light source array 510 is disposed in the second chamber of the HMD 500, the planar light source 511 can cooperatively provide light 505b.

Taking the light source array 540 as an example, it may include 9×2 planar light sources 541. When the light source array 540 is disposed in the first or second chamber of the HMD 500, the planar light source 541 can cooperatively provide light 505a or 505b. In addition, the light source array 540 can also be adjusted to be a light source array 540a which includes two rows of the planar light source 541 (each of which includes 9×1 planar light sources 541). Moreover, the two rows of planar light sources 541 in the light source array 540a may be respectively disposed in the first chamber and the second chamber of the HMD 500 to provide lights 505a and 505b, respectively. In addition, the aspects and the manners of being disposed of the light source arrays 520, 530, and 550 can be referred to the related descriptions of the light source arrays 510 and 540, and are not described herein.

Figure 6:
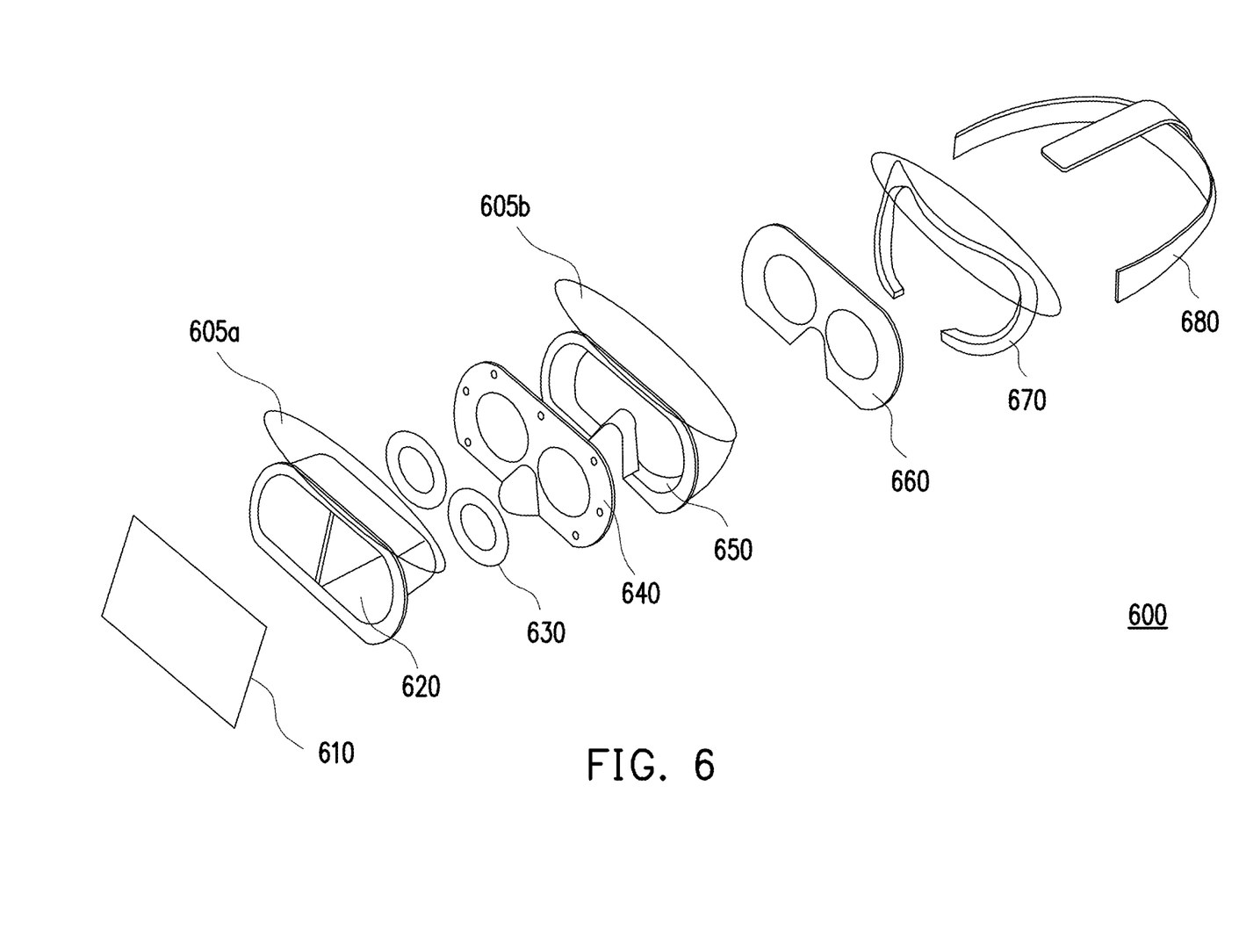
FIG. 6 is an exploded view of an HMD according to an embodiment of the disclosure.

Please refer to FIG. 6, which is an exploded view of an HMD according to an embodiment of the disclosure. As shown in FIG. 6, the HMD 600 may sequentially include a display 610, a first chamber 620, a lens 630, a light blocking member 640, a second chamber 650, an appearance member 660, a cushioning material 670, and a headband 680, wherein the top sides of the first chamber 620 and the second chamber 650 may be provided with light sources for providing lights 605a and 605b, respectively. However, the structure of the HMD 600 shown in FIG. 6 is merely an example and is not intended to limit the possible embodiments of the present disclosure.

Figure 7:
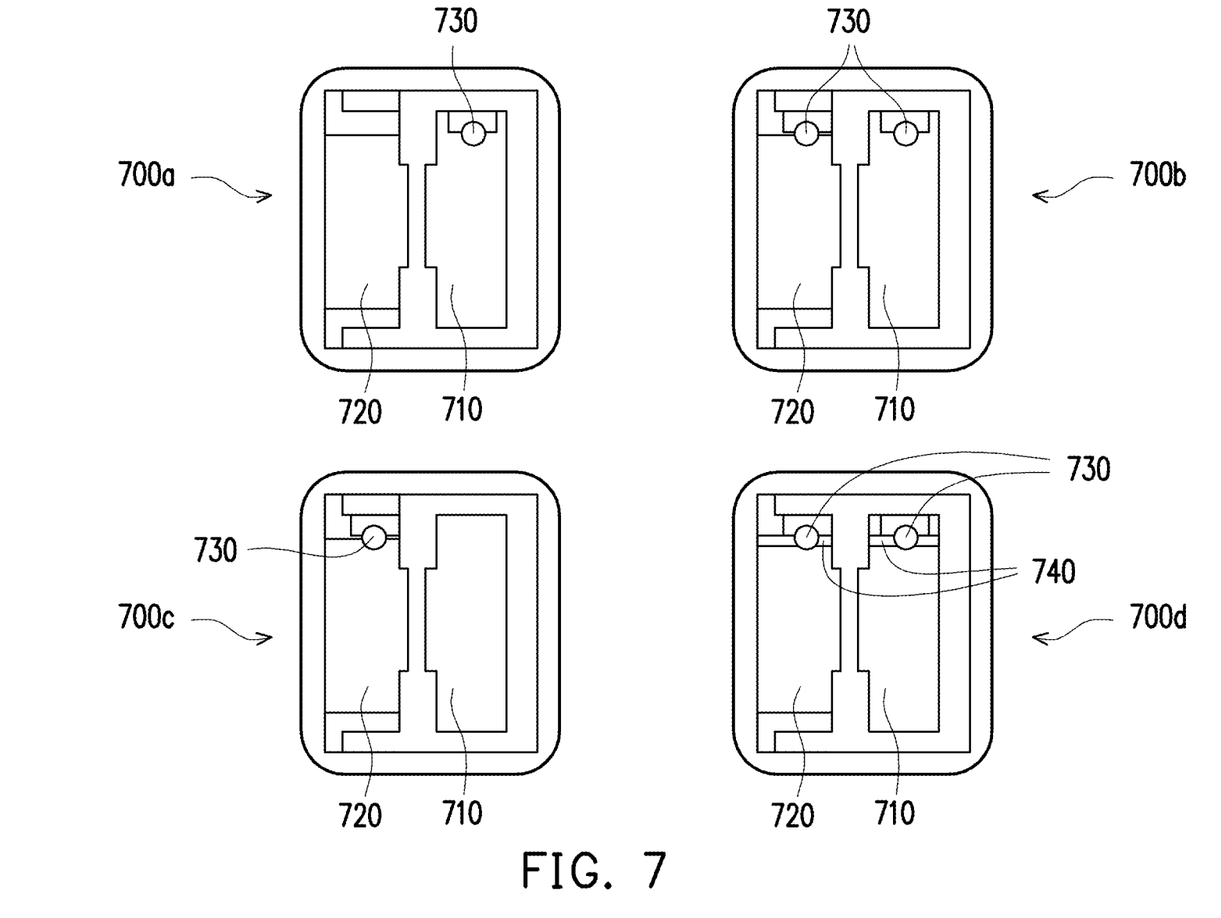
FIG. 7 shows side cross-sectional views of the HMD according to various embodiments of the present disclosure.

Please refer to FIG. 7, which shows side cross-sectional views of the HMD according to various embodiments of the present disclosure. As shown in HMD 700a, light source 730 of the present disclosure may be disposed only in first chamber 710. As shown in HMD 700b, the light source 730 of the present disclosure can be disposed in both the first chamber 710 and the second chamber 720. As shown in HMD 700c, light source 730 of the present disclosure may also be disposed only in second chamber 720.

In addition, as shown in FIG. 7, the HMD 700d of the present disclosure may further include a matting layer 740 attached to the light source 730 for absorbing various impurities present in the first chamber 710 and the second chamber 720. Disperse light to prevent stray light from affecting the wearer's visual experience.

Figure 8:
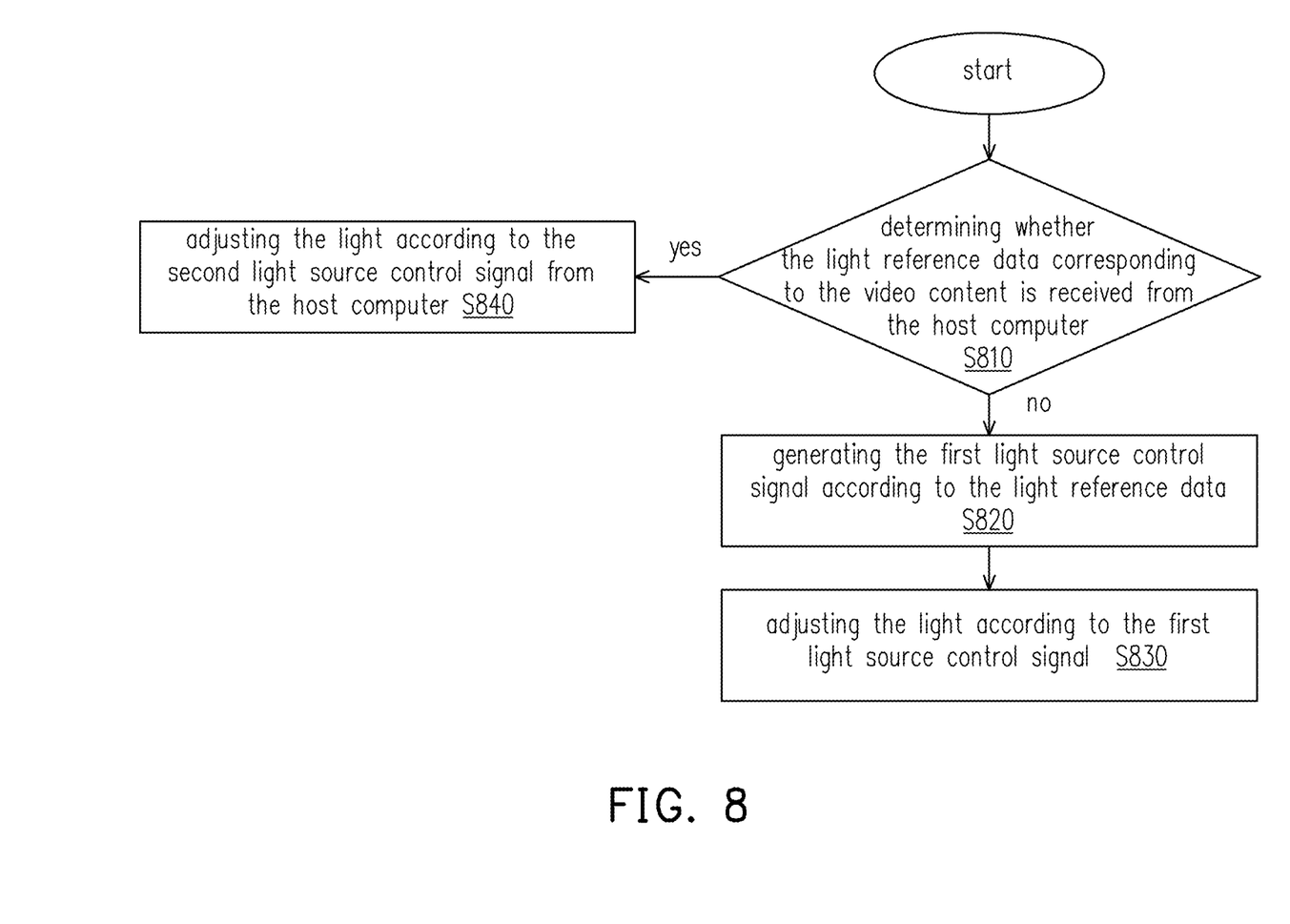
FIG. 8 is a flow chart of adjusting light according to an embodiment of the disclosure.

Please refer to FIG. 8, which is a flow chart of adjusting light according to an embodiment of the disclosure. In this embodiment, it is assumed that the signal processor in the HMD can retrieve a video content from a host computer coupled to the HMD or a system state of the HMD, and accordingly control the light source to provide lights. Therefore, in step S810, the signal processor can determine whether the light reference data corresponding to the video content is received from the host computer. In various embodiments, the light reference data may be the top image of the previously mentioned 360-degree image or the part of the video content corresponding to the side of the light source.

If the signal processor determines that the light reference data has been received from the host computer, step S820 may be performed to generate the first light source control signal according to the light reference data. In an embodiment, if the received light reference data is a top image of a 360-degree image, the first light source control signal generated by the signal processor can be used to adjust the light emitted by the light source to correspond to the color of the top image. For example, if the top image is a blue sky, the first light source control signal can be used to control the light source to emit a blue color corresponding to the blue sky. For another example, if the top image is a starry sky, the first light source control signal may be used to control the light source to emit black corresponding to the starry sky, but the present disclosure is not limited thereto.

In step S830, the signal processor can adjust the light according to the first light source control signal. In an embodiment, for each light emitted by the light source, the signal processor can be controlled by a corresponding first light source control signal, as shown in Table 1 below.

TABLE 1

| R | G | B | strength | meaning |
|---|---|---|---|---|
| 1 | 1 | 0 | 1 | Light can be red, yellow or green. The available strength is only on or off. |
| 1 | 0 | 1 | 32 | Allows the light to appear red, blue or purple. The available intensity is 32 levels (but the intensity of red and blue should be consistent). |
| 16 | 16 | 0 | 1 | Supports 256 colors based on a combination of red/green |
| 255 | 255 | 255 | 1 | Supports 16,777,216 colors based on a combination of red/green/blue |

Moreover, when there are multiple light sources, for the light source to be controlled, the signal processor may further add identity information (such as a string or a coordinate) corresponding to the light source to the corresponding first light source control signal, thereby the considered light source can be controlled more accurately.

In other words, the signal processor can provide light sources of different colors by independently controlling the respective light sources. In this way, the light source disposed in the HMD can cooperate to provide a more detailed light level, thereby allowing the user to have a better visual experience.

In addition, if the signal processor determines that the light reference data is not received from the host computer, step S840 may be performed to adjust the light according to the second light source control signal from the host computer. In this embodiment, the second light source control signal is, for example, an operating state (e.g., a game state) corresponding to the video content or a system state of the HMD (e.g., a device pairing state, etc.). Thereby, the light provided by the HMD light source can be changed in response to the operating state of the video content (for example, red due to attack) or the system state of the HMD (e.g., power state, etc.).

Figure 9A:
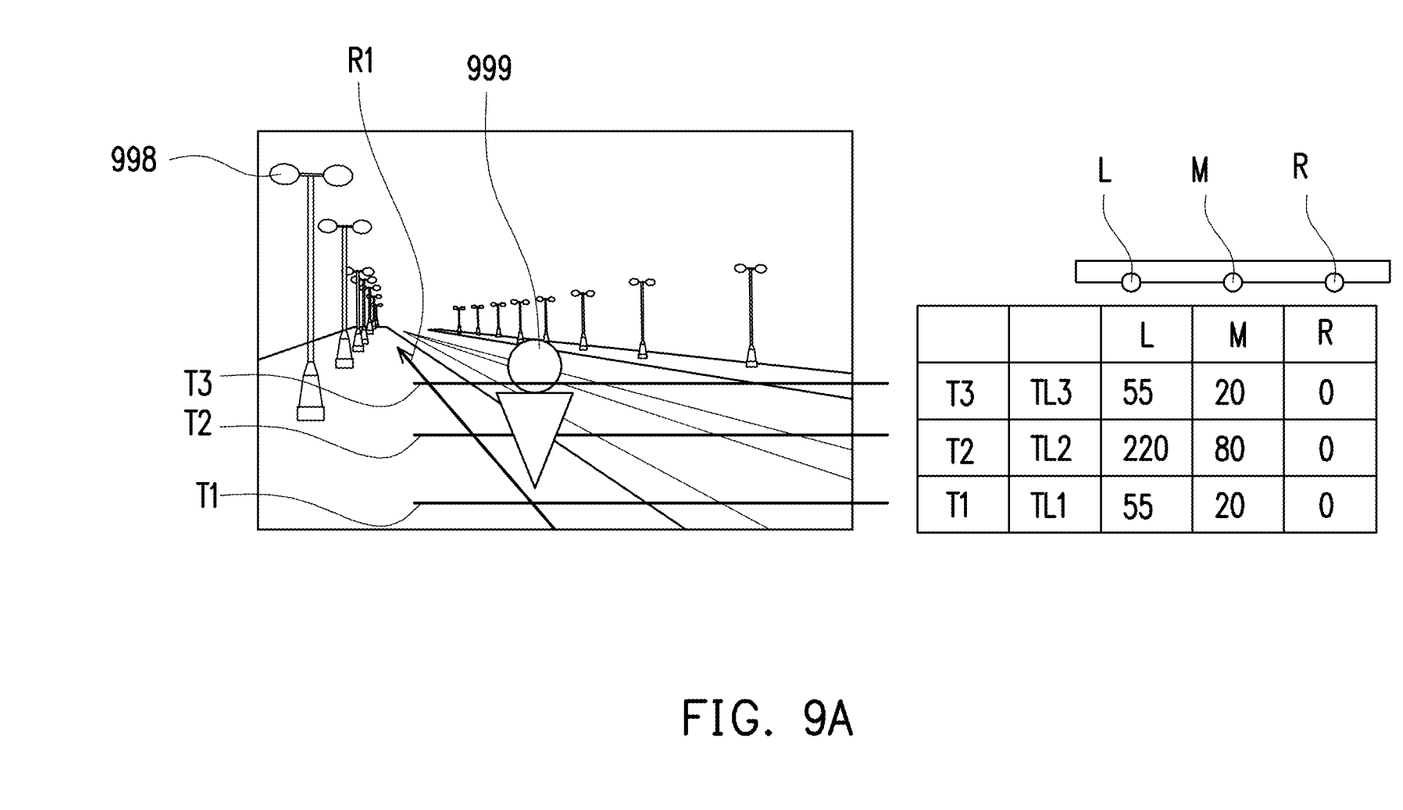
FIG. 9A is a schematic diagram of a VR scenario according to an embodiment of the disclosure.
Figure 9B:
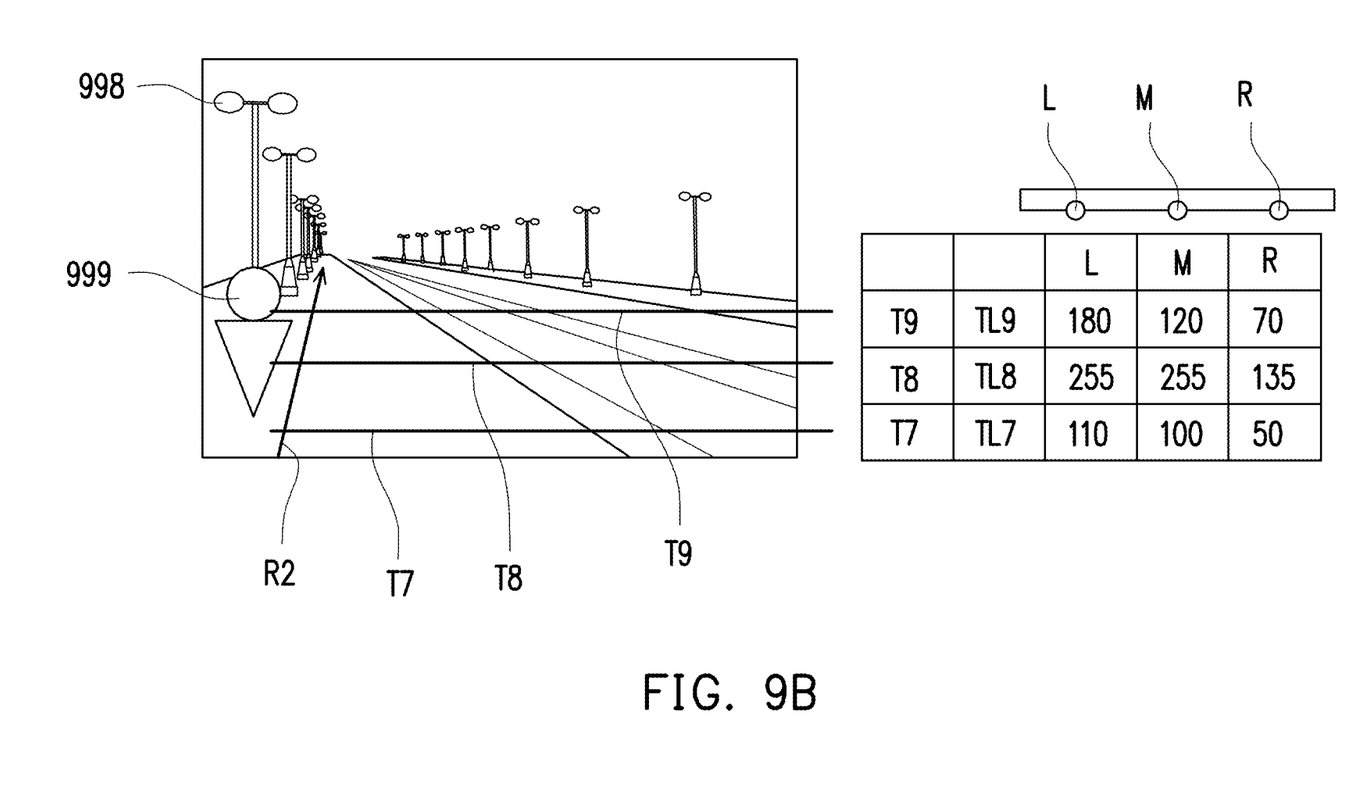
FIG. 9B is a schematic diagram of a VR scenario according to FIG. 9A of the present disclosure.

In order to make the present disclosure easier to understand, the following is further described based on FIGS. 9A and 9B.

Please refer to FIG. 9A, which is a schematic diagram of a VR scenario according to an embodiment of the disclosure. As shown in FIG. 9A, it is assumed that the role 999 of the wearer of the HMD of the present disclosure in the VR environment is moving along the route R1 in the illustrated VR scene (for example, a platform with a street lamp 998), and sequentially passing through locations T1, T2 and T3. Further, in FIG. 9A, the light sources L, M, and R are disposed in the considered HMD, and the light intensity provided by the light sources L, M, and R may vary in response to the process of the role of the character 999 walking in the route R1.

Specifically, the process in which the character 999 passes through the locations T1 to T3 in sequence can be regarded as a process in which the character 999 gradually approaches the street lamp 998 and then gradually moves away from the street lamp 998. During this process, the HMD may generate corresponding first light source control signals to control the light sources L, M, and R according to the top images TL1, TL2, and TL3 corresponding to the locations T1 T T3, respectively.

For example, when the character 999 is located at the location T1, since the top image TL1 (i.e., the light reference data) should present weak light from the upper left, the signal processor can issue the first light source control signal as (L, 55), (M, 20), (R, 0), thereby adjusting the intensities of the light sources L, M, and R to 55, 20, and 0, respectively. In this case, the wearer of the HMD can feel the weak light from the upper left.

When the character 999 proceeds to the location T2, since the top image TL2 (i.e., the light reference data) should present a strong light from the upper left, the signal processor can issue the first light source control signal as (L, 220), (M, 80), (R, 0), thereby adjusting the intensities of the light sources L, M, and R to 220, 80, and 0, respectively. In this case, the wearer of the HMD can feel the strong light from the upper left.

When the character 999 proceeds to the location T3, since the top image TL3 (i.e., the light reference data) should present weaker light from the upper left, the signal processor can issue the first light source control signal as (L, 55), (M, 20), (R, 0), thereby adjusting the intensities of the light sources L, M, and R to 55, 20, and 0, respectively. In this case, the wearer of the HMD can feel the weak light from the upper left.

In this way, the wearer of the HMD can feel the immersive effect, thereby improving the wearer's operating experience.

Please refer to FIG. 9B, which is a schematic diagram of a VR scenario according to FIG. 9A of the present disclosure. As shown in FIG. 9B, it is assumed that the role 999 of the wearer of the HMD of the present disclosure in the VR environment is walking along the route R2 in the shown VR scene (for example, a platform with a street lamp 998), and sequentially passing through locations T7, T8 and T9. Further, in FIG. 9B, the light sources L, M, and R are disposed in the considered HMD, and the light intensities provided by the light sources L, M, and R may vary in response to the process of the role of the character 999 walking in the route R2.

Similar to FIG. 9A, the process in which the character 999 passes through the locations T7-T8 in sequence can also be regarded as the process in which the character 999 first approaches the street light 998 and then gradually moves away from the street light 998. The only difference is that the route R2 is closer to the street light 998 than the route R1. In the above process, the HMD can generate corresponding first light source control signals to control the light sources L, M, and R according to the top images TL7, TL8, and TL9 corresponding to the locations T7-T9, respectively.

For example, when the character 999 is located at the location T7 (e.g., under the street light 998), the signal processor can issue the first light source control signal as (L, 110), (M, 100), (R, 50) because the top image TL7 (i.e., the light reference data) should present a strong light from the oblique front, thereby adjusting the intensities of the light sources L, M, and R to 110, 100, and 50, respectively. In this case, the wearer of the HMD can feel the strong light from the oblique front.

When the character 999 proceeds to the location T8, since the top image TL8 (i.e., the light reference data) should present intense light from directly above, the signal processor can issue the first light source control signal as (L, 255), (M, 255), (R, 135), thereby adjusting the intensities of the light sources L, M, and R to 255, 255, and 135, respectively. In this case, the wearer of the HMD can feel the strong light from directly above.

When the character 999 proceeds to the location T9, since the top image TL9 (i.e., the light reference data) should present light from the left behind, the signal processor can issue the first light source control signal as (L, 180), (M, 120), (R, 70), thereby adjusting the intensities of the light sources L, M, and R to 170, 120, and 70, respectively. In this case, the wearer of the HMD can feel the light from the left behind.

In addition to the above mentioned situations, the ambient light of the car entering and leaving the tunnel in the video content, the fluorescent lamp on the head of the clerk in the game, the skylight penetrated by the transparent skylight of the virtual arena, the ambient light in the factory, the sunlight on the beach, the fire of the gun battle and the candlelight shadow of the castle, etc., can make the HMD wearer feel the immersive effect through the additional light provided by the HMD of the disclosure, thereby improving the wearer's operating experience.

In summary, the HMD and the light adjusting method of the present disclosure can provide additional light through a light source disposed in the first chamber and/or the second chamber, thereby allowing the wearer to experience a better visual experience. Moreover, depending on the application, the above-mentioned light can also exhibit different changes based on the operating state of the video content and/or the system state of the HMD, so that the wearer can feel the immersive feeling more.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A head-mounted display (HMD), comprising:
   a housing
   a first chamber, disposed in the housing and disposed with a display, wherein the display is used for playing a video content;
   a second chamber, disposed in the housing and adjacent to the first chamber, wherein a through hole is disposed between the second chamber and the first chamber, and the video content propagates from the first chamber to the second chamber via the through hole;
   at least one light source, disposed on at least one side of at least one of the first chamber and the second chamber, wherein the at least one light source provides at least one light in response to the video content or a system state of the HMD;
   wherein the head-mounted display is connected to a host computer and receives the video content from the host computer;
   wherein the HMD further comprises a signal processor coupled to the at least one light source, wherein the signal processor is configured to:
      determine whether a light reference data corresponding to the video content is received from the host computer;
      in response to receiving the light reference data from the host computer, generate a first light source control signal according to the light reference data, and adjust the at least one light according to the first light source control signal,
      in response to not receiving the light reference data from the host computer, adjust the at least one light according to a second light source control signal from the host computer, wherein the second light source control signal corresponds to an operating state of the video content or a system state of the head-mounted display.

2. The head-mounted display of claim 1, wherein the display is disposed on a front side of the first chamber, the through hole is disposed on a rear side of the first chamber, and the front side of the first chamber is opposite to the rear side of the first chamber.

3. The head-mounted display of claim 1, wherein the first chamber has a top side, a bottom side, a left side, and a right side, and the at least one light source is disposed on at least one of the top side, the bottom side, the left side, and the right side of the first chamber.

4. The head-mounted display of claim 1, wherein the second chamber has a front side and an open side, the front side of the second chamber is opposite to the open side of the second chamber, the open side is disposed on a front side of the second chamber, the through hole is disposed on the front side of the second chamber, and the open side of the second chamber is for receiving a face of a wearer of the head-mounted display.

5. The head-mounted display of claim 1, wherein the second chamber has a top side, a bottom side, a left side, and a right side, and the at least one light source is disposed on at least one of the top side, the bottom side, the left side, and the right side of the second chamber.

6. The head-mounted display of claim 1, wherein the at least one light source is arranged as an array of light sources.

7. The head-mounted display of claim 1, wherein in response to receiving the first light source control signal, the signal processor is further configured to adjust the at least one light according to the first light source control signal.

8. The head-mounted display of claim 1, further comprising a light absorbing layer attached to the at least one light source.

9. The head-mounted display of claim 1, further comprising a light guide plate attached to the at least one light source.

10. A light adjusting method of a head-mounted display (HMD), wherein the HMD comprises a first chamber, a second chamber, and at least one light source, and the method comprises:
    retrieving a video content of a display in the first chamber or a system state of the HMD; and
    controlling the at least one light source to provide at least one light in response to the video content or a system state of the HMD, wherein the at least one light source is disposed on at least one side of at least one of the first chamber and the second chamber, wherein the head-mounted display is connected to a host computer and receives the video content from the host computer;
    wherein the step of controlling the at least one light source to provide the at least one light in response to the video content or the system state of the HMD comprises:
      determining whether a light reference data corresponding to the video content is received from the host computer;
      in response to receiving the light reference data from the host computer, generating a first light source control signal according to the light reference data, and adjust the at least one light according to the first light source control signal;
      in response to not receiving the light reference data from the host computer, adjusting the at least one light according to a second light source control signal from the host computer, wherein the second light source control signal corresponds to an operating state of the video content or the system state of the head-mounted display.

11. The method of claim 10, wherein the at least one light source is arranged as an array of light sources.

12. The method of claim 10, wherein in response to receiving the first light source control signal, the method further comprising:
    adjusting the at least one light according to the first light source control signal.

13. The method of claim 10, wherein the light reference data comprises a top image of a 360-degree image or a part of the video content corresponding to the at least one side of the at least one light source.

14. The method of claim 13, wherein the first light source control signal is used to adjust the at least one light to be a color corresponding to the top image of the 360-degree image or the part of the video content.

* * * * *